United States Patent [19]

Dillon et al.

[11] 3,996,586

[45] Dec. 7, 1976

[54] MAGNETIC TAPE PULSE WIDTH TO DIGITAL CONVERTOR

[75] Inventors: Walter C. Dillon; Roderick S. Mesecar, both of Corvallis, Oreg.

[73] Assignee: The United States of America as represented by the Secretary of the Navy, Washington, D.C.

[22] Filed: Sept. 20, 1974

[21] Appl. No.: 508,008

[52] U.S. Cl. .................... 340/347 DD; 307/234; 328/111; 360/40
[51] Int. Cl.² .................. G11B 5/09; H03K 13/24
[58] Field of Search .......... 360/44, 42, 40; 340/347 DD; 328/111; 307/234

[56] References Cited

UNITED STATES PATENTS

| | | | |
|---|---|---|---|
| 3,320,430 | 5/1967 | Gorman | 235/61.71 E |
| 3,377,583 | 4/1968 | Sims | 360/44 |
| 3,414,894 | 12/1968 | Jacoby | 340/347 DD X |
| 3,493,962 | 2/1970 | Vallee | 340/347 DD |
| 3,727,202 | 4/1973 | Fort | 360/42 X |
| 3,737,895 | 6/1973 | Cupp et al. | 340/347 DD |
| 3,737,896 | 6/1973 | Gabor | 360/42 X |

*Primary Examiner*—Thomas J. Sloyan
*Attorney, Agent, or Firm*—R. S. Sciascia; Charles D. B. Curry

[57] ABSTRACT

A magnetic tape translator for converting information on a magnetic tape having a format of short pulses and long pulses into the more unusual format of 1's and 0's, respectively. This is achieved by the use of a unique logic circuit employing a plurality of flip-flop devices, multivibrators and AND gates. The circuit has the advantage of being relatively insensitive to noise and may be used for 10-bit words.

4 Claims, 5 Drawing Figures

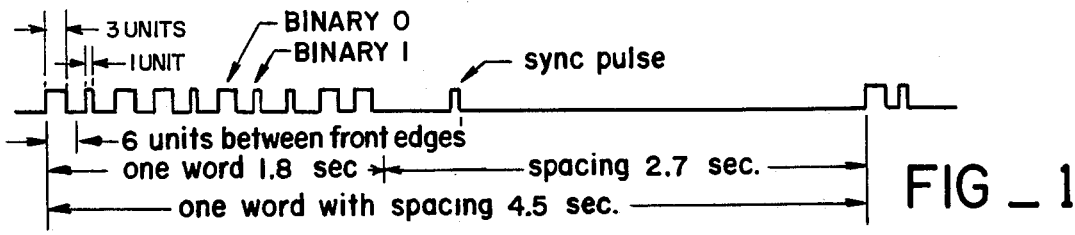
FIG_1
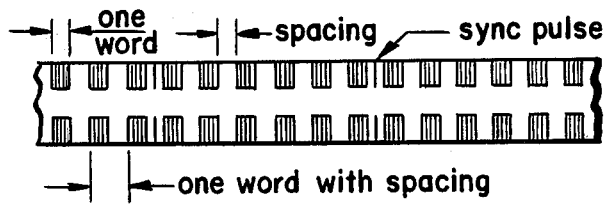
FIG_2
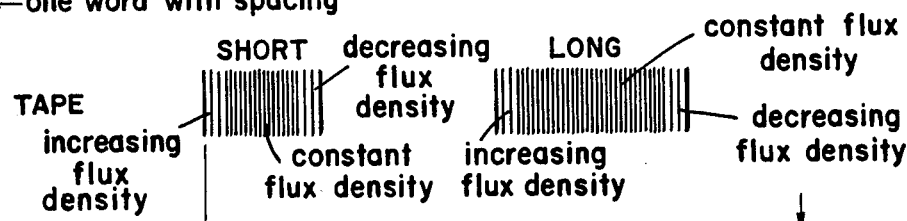
FIG_4

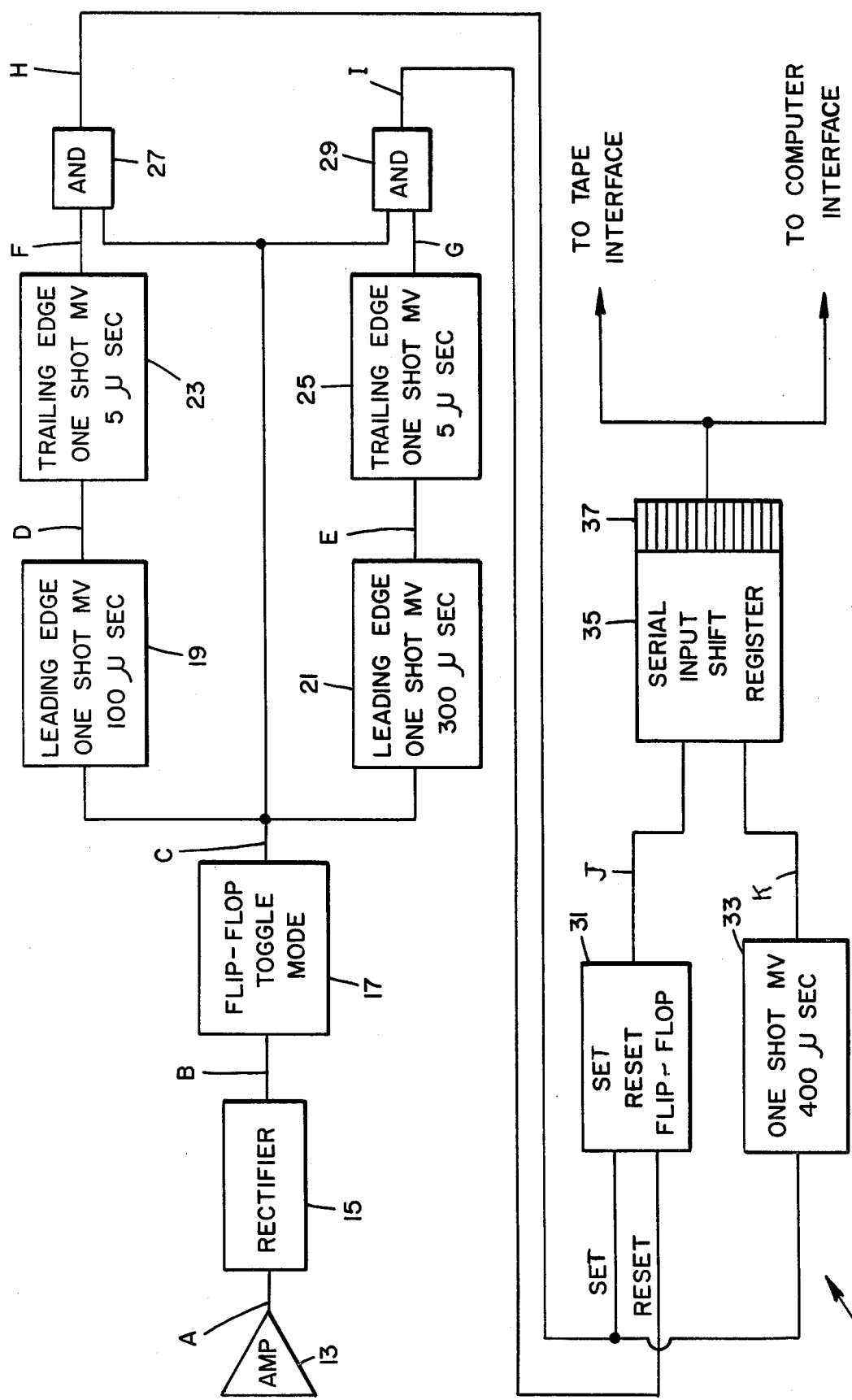

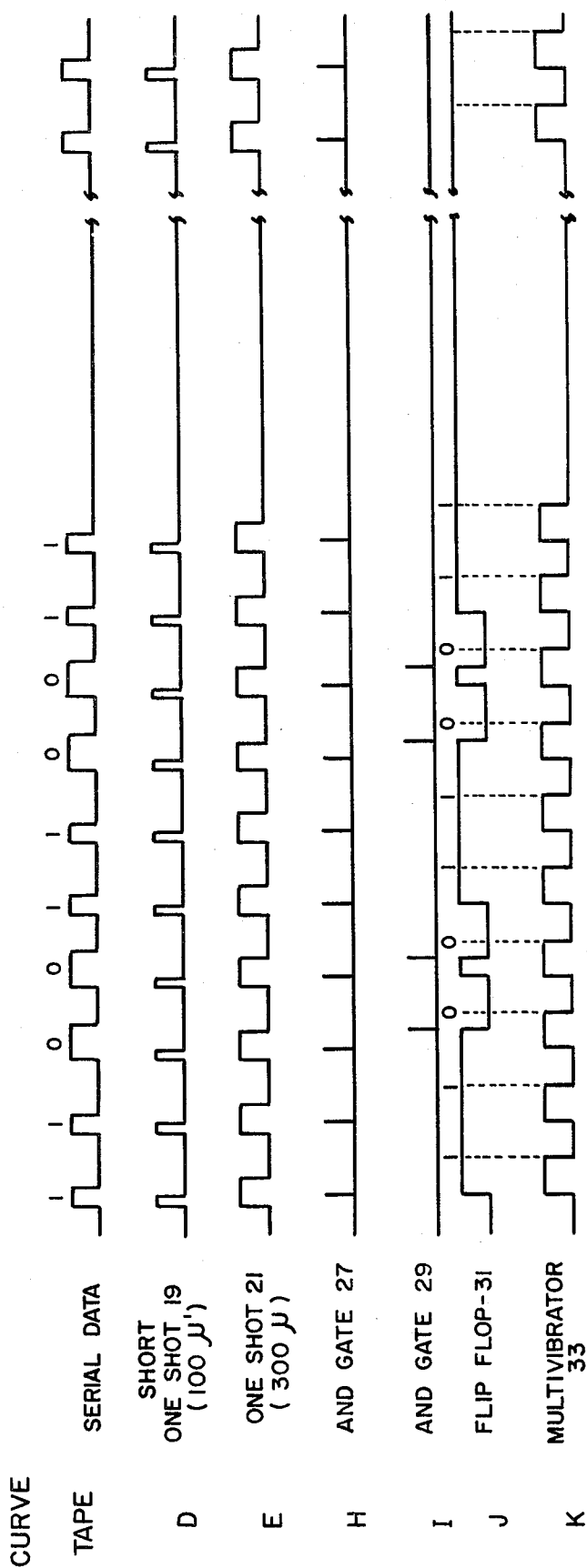
FIG_5

MAGNETIC TAPE PULSE WIDTH TO DIGITAL CONVERTOR

BACKGROUND OF THE INVENTION

1. Field of the Invention

The present invention relates to a magnetic tape translator and more particularly to a translator for converting short and long pulses into 1's and 0's or pulses and no pulses.

2. Description of the Prior Art

Certain data collecting instruments use a special format to record digitally on magnetic tape. One format is such that a short length of tape is magnetized for a logic one and a long length of tape is magnetized for a logic zero. The ratio of long to short length is typically about 3:1, with the distance between leading edges being constant. This has the disadvantage of providing a logic format that is not compatible with many types of more conventional logic equipment. The present invention overcomes this difficulty by providing an automatic tape translator that converts the format of short and long pulses into a format of 1's and 0's.

SUMMARY OF THE INVENTION

Briefly, the present invention comprises a magnetic tape translator for converting information on a magnetic tape having a format of short pulses and long pulses into the more usual format of 1's and 0's, respectively. This is achieved by the use of a unique logic circuit employing a plurality of flip-flop devices, multivibrators and AND gates. The circuit has the advantage of being relatively insensitive to noise and may be used for 10-bit words.

STATEMENT OF THE OBJECTS OF THE INVENTION

An object of the present invention is to provide an automatic translator for converting information from one digital format to another digital format;

Another object of the present invention is to provide a translation device that converts logic information contained in a format of short pulses and long pulses into a format of 1's and 0's or pulses and no pulses;

Other objects, advantages and novel features of the present invention will become apparent from the following detailed description of the invention when considered in conjunction with the accompanying drawings wherein:

BRIEF DESCRIPTION OF THE DRAWINGS

FIG. 1 is a drawing illustrating the electrical output signals of a tape device that has recorded on the tape a digital format of short pulses and long pulses;

FIG. 2 is a drawing illustrating the format on the magnetic tape used in the tape device of FIG. 1;

FIG. 3 is a block diagram of the magnetic tape translator of the present invention;

FIG. 4 is a group of curves illustrating the operation of the translator of FIG. 4; and FIG. 5 is a group of curves illustrating the operation of the translator of FIG. 4.

DESCRIPTION OF THE PREFERRED EMBODIMENT

Certain types of equipment use a special signal format to record digitally on magnetic tape. One such format is illustrated in FIG. 1 wherein the binary 0 is a long pulse and the binary 1 is a short pulse. The long pulses may be 90 milliseconds (3 units), for example, and the short pulses may be 30 milliseconds (1 unit), for example. The distance between the leading edges of the short and long pulses may be 180 milliseconds (6 units), for example, and is constant. The information may be serially contained in 10-bit binary words wherein each word may be about 1.8 seconds or about 4.5 seconds with a 2.7 seconds spacing between the 10-bit words. A synchronous pulse may be provided after a group of six words, for example, which permits proper channel identification.

In FIG. 2 is illustrated the technique employed for magnetizing the tape to contain the above described binary words. The tape may be ¼ inch wide, for example, containing two identical tracks. In recording bits on the tape, there will be variation in flux density. In FIG. 4 is illustrated, adjacent the legend "TAPE", this variation in flux density wherein the leading edge of the bit has an increasing flux density, the center section has a constant flux density and the trailing edge has a decreasing flux density. A short bit will have a short center section of constant flux density whereas a long bit will have a longer center section of constant flux density. The leading or trailing edges of the short and long bits will have about the same increasing and decreasing flux density patterns. In FIG. 4 the increasing and decreasing flux density sections are exaggerated for purpose of illustration. In FIG. 4, Curve A, is illustrated the voltage output of a tape recorder that is reading the above described magnetic tape. The slope of the pulses (short and long) are due to the rate of change of flux as a function of time $d\phi/dt$. The negative pulse signal is due to increasing flux and the positive pulse signal is due to decreasing flux. A typical voltage output would be a few mullivolts and after amplification about 6 volts.

It should be noted that information is recorded on the tape of FIG. 2 when the tape is moving at a very low speed. However, the tape readout is at a high speed resulting in a signal time duration of about $150\mu$ seconds for short pulses and $450\mu$ seconds for long pulses as shown in FIG. 4.

The purpose of the tape translator of the present invention is to convert the above described type of format into one which is considered a normal logic form to render it suitable for transcribing onto another tape or for introduction into a computer. That is, the short pulses are converted into 1's (positive voltage) and the long pulses are converted into 0's (no voltage). In FIG. 3 is illustrated the block diagram of the tape translator 11 of the present invention. The letter symbols of FIG. 3 correspond to the letter symbols identifying the curves of FIGS. 4 and 5. The electrical output signal of the previously described tape is applied to the input of amplifier 13. The output of amplifier 13 is applied to the input of rectifier 15 the output of which is applied to the input of toggle mode type flip-flop device 17. The output of flip-flop device 17 is respectively applied to the inputs of one shot multivibrators 19 and 21. Multivibrators 19 and 21 are of the type that are responsive to the leading edge of an input signal and have pulse time durations of $100\mu$ seconds and $300\mu$ seconds, respectively. The output of multivibrators 19 and 21 are respectively applied to the inputs of one shot multivibrators 23 and 25. Multivibrators 23 and 25 are of the type that are responsive to the trailing edge of an input signal and have pulse time durations of about 5μ seconds. The outputs of multivibrators 23 and 25 are respectively applied to the inputs of AND gates 27 and 29. The other input to AND gates 27 and 29 is from the output of flip-flop device 17.

The output of AND gate 27 is applied to the set input of set-reset flip-flop device 31 and to the input of one shot multivibrator 33. The output of AND gate 29 is applied to the reset input of set-reset flip-flop device 31. The outputs of flip-flop device 31 and multivibrator 33 are applied to the respective inputs of serial input shift register 35. The output 37 of shift register 35 contains a 10-bit word in 0 and 1 format which is translated from and corresponds to the short and long signals of the input tape format. The output 37 of shift register 35 may be transferred to a tape interface or a computer interface or the like either serially or in parallel. The operation of the tape translator 11 of the present invention is as follows.

OPERATION

Referring to the block elements and the associated signal identification symbols of FIG. 3 and to the timing diagrams of FIGS. 4 and 5 the operation of the tape translator is as follows. Curve A of FIG. 4 shows the output of amplifier 13 wherein the signals due to the short and long tape bits are indicated. Curve B of FIG. 4 shows the output of rectifier 15 for the short and long tape bits. Curve C of FIG. 4 shows the output of flip-flop 17 for the short and long tape bits. It should be noted that flip-flop 17 is of the toggle mode type and is therefore responsive to only the leading edge of the input signals as indicated at points M and N on the curve B signals. The output of flip-flop 17 for a short bit is a square wave of about 150μ seconds time duration and the output for a long bit is a square wave of about 450μ seconds time duration. Curves D of FIGS. 4 and 5 shows the output sequence of multivibrator 19 wherein each pulse is of 100μ seconds duration and is initiated by the leading edges of the curve C short and long pulses from flip-flop 17. Curves E of FIGS. 4 and 5 shows the output sequence of multivibrator 21 wherein each pulse is of 300μ seconds duration and is initiated by the leading edges of the curve C short and long pulses from flip-flop 17. Curve F of FIG. 4 shows the output of multivibrator 23 wherein each pulse is of 5μ seconds duration and is initiated by the trailing edges of the output pulses from multivibrator 19. Curve G of FIG. 4 shows the output of multivibrator 25 wherein each pulse is of 5μ seconds duration and is initiated by the trailing edges of the output pulses from multivibrator 21.

From this it can be seen that AND gate 27 provides a 5μ second output pulse when either a short or long pulse is present whereas AND gate 29 provides a 5μ second pulse only when a long pulse is present. However, AND gate 29 produces no pulse when a short pulse is present. That is, referring to curves C and F, each of the short and long 5μ second pulses of curve F respectively occur when each of the short (150μ second) and long (450μ second) pulses of curve C occur. This is illustrated in curve H of FIG. 7. Conversely, referring to curves C and G, only the long 5μ second pulse of curve G occurs when the long 450μ second pulse of curve C is present. The short 5μ second pulse of curve G occurs after the termination of the 150μ second pulse of curve C. Therefore, AND gate provides a 5μ second output pulse only when there is a long pulse. This is illustrated in curve I of FIG. 7.

Curve J of FIG. 7 shows the serial data output from set-reset flip-flop 31. It should be noted that the output of flip-flop 31 goes positive, or to a 1 level, when the set input has received a 5μ second signal from AND gate 27. As previously explained this occurs for both the long and short pulses. Flip-flop 31 goes to a 0 level only when it has been reset. As previously explained this occurs only with the occurrence of a long pulse. Therefore, the output of flip-flop 31 is continuously at a 1 level, having been set by the occurrence of the leading edge of either a short or a long pulse, until there occurs a long pulse which results in an output pulse from gate 29 that resets set-reset flip-flop 31. This can be seen by comparing curves H, I and J of FIG. 5. As illustrated in curve K of FIG. 5 multivibrator 33 provides a 400μ second output pulse upon the occurrence of a 5μ second pulse from AND gate 27 which occurs for both short or long pulses.

Upon the occurrence of the trailing edge of multivibrator 33, shift register 35 interrogates the state of the input from flip-flop 31. Therefore, shift register 35 will sequentially store as 1's or 0's the 10-bit serial input as indicated by the 1's and 0's of curve J of FIG. 5. The 1's and 0's stored in the output 37 of shift register 35 may be then transferred to tape or computer interface equipment.

The details of the various devices denoted in the FIG. 3 block diagram of the magnetic tape translator of the present invention are not illustrated since their individual construction and operation are well known to those skilled in the art.

It is to be understood that the present invention may be practiced on short and long signal formats derived from any source. Also, the short and long signal formats may be different from those shown and described herein for purpose of illustration. It is also to be understood that different voltages, signal wave forms, time durations and timing sequences may be employed providing they are compatible with the basic concepts of the present invention.

What is claimed is:

1. A translator device for translation of digital information contained in a first format of short pulses and long pulses into a second format signal of pulses and no pulses including:

a. generator means for generating said first format wherein each of said short pulses has a leading edge and a trailing edge and each of said long pulses has a leading edge and a trailing edge;
   b. a first leading edge responsive one shot multivibrator the output of which is connected to the input of a first trailing edge one shot multivibrator the output of which is connected to the input of a first AND gate;
   c. the output of said genrator means being connected to the input of said first leading edge responsive one shot multivibrator and to said first AND gate;
   d. a second leading edge responsive one shot multivibrator the output of which is connected to the input of a second trailing edge one shot multivibrator the output of which is connected to the input of a second AND gate;
   e. the output of said generator means being connected to the input of said second leading edge responsive one shot multivibrator and to said second AND gate;
   f. a set-reset flip-flop device, a one shot multivibrator, and a serial input shift register;

g. the output of said first AND gate being connected to the set input of said set-reset flip-flop device and to the input of said one shot multivibrator;
h. the output of said second AND gate being connected to the reset input of said set-reset flip-flop device;
i. the output of said set-reset flip-flop device and the output of said one shot multivibrator being connected to the inputs of said shift register;
j. said first AND gate provides first clock signals in response to both short and long pulses and said second AND gate provides second clock signals in response to only long pulses; whereby
k. said flip-flop device providing an output in response to said first clock signals and no output only during the time duration between the occurrence of said second clock signal and the immediately following first clock signal and said multivibrator interrogating the output of said flip-flop at a predetermined time interval after the occurrence of each of said first clock pulses to determine whether said flip-flop is providing an output or no output.

2. The device of claim 1 wherein:
a. said generator means comprises an amplifier, rectifier and toggle mode type flip-flop device;
b. the output of said amplifier being connected to the input of said rectifier and the output of said rectifier being connected to the input of said flip-flop device.

3. The device of claim 1 wherein:
a. the pulse from said first leading edge responsive one shot multivibrator is about $100\mu$ seconds and the pulse from said first trailing edge one shot multivibrator is about $5\mu$ seconds.

4. The device of claim 3 wherein:
a. the pulse from said second leading edge responsive one shot multivibrator is about $300\mu$ seconds and the pulses from said second trailing edge one shot multivibrator is about $5\mu$ seconds.

* * * * *